United States Patent
Waga et al.

(10) Patent No.: US 10,296,845 B2
(45) Date of Patent: May 21, 2019

(54) ATTRIBUTE ESTIMATION SYSTEM

(71) Applicant: NEC Solution Innovators, Ltd., Koto-ku, Tokyo (JP)

(72) Inventors: Iwao Waga, Tokyo (JP); Tomomi Kinoshita, Tokyo (JP); Mitsuhiro Fujita, Tokyo (JP)

(73) Assignee: NEC SOLUTION INNOVATORS, LTD., Tokyo (JP)

( * ) Notice: Subject to any disclaimer, the term of this patent is extended or adjusted under 35 U.S.C. 154(b) by 691 days.

(21) Appl. No.: 14/899,199

(22) PCT Filed: May 19, 2014

(86) PCT No.: PCT/JP2014/063203
§ 371 (c)(1),
(2) Date: Dec. 17, 2015

(87) PCT Pub. No.: WO2015/001856
PCT Pub. Date: Jan. 8, 2015

(65) Prior Publication Data
US 2016/0148117 A1 May 26, 2016

(30) Foreign Application Priority Data
Jul. 1, 2013 (JP) ................................. 2013-137854

(51) Int. Cl.
*A47G 1/02* (2006.01)
*G06K 9/00* (2006.01)
(Continued)

(52) U.S. Cl.
CPC ............... *G06N 20/00* (2019.01); *A47G 1/02* (2013.01); *G06F 16/583* (2019.01); *G06K 9/00221* (2013.01); *G06K 2009/00322* (2013.01)

(58) Field of Classification Search
USPC .......................................................... 706/12
See application file for complete search history.

(56) References Cited

U.S. PATENT DOCUMENTS

| 6,188,777 B1 * | 2/2001 | Darrell ............... G06K 9/00362 348/169 |
| 6,445,810 B2 * | 9/2002 | Darrell ............... G06K 9/00362 382/115 |

(Continued)

FOREIGN PATENT DOCUMENTS

| JP | S61-126857 U | 8/1986 |
| JP | 2005148797 A | 6/2005 |

(Continued)

OTHER PUBLICATIONS

Elsevier Computer Networks vol. 38, Issue 4, Mar. 15, 2002, pp. 393-422, Wireless sensor networks: a survey I.F. Akyildiz, W. Su, Y. Sankarasubramaniam, E. Cayirci.*

(Continued)

*Primary Examiner* — Michael B Holmes (57) ABSTRACT

The present invention provides an attribute estimation system capable of acquiring an image of a person whose attributes are to be estimated accurately and informing the person of an attribute estimation result. The attribute estimation system (1) includes: a mirror (11) equipped with an information display terminal (12); and an attribute estimation device (3). The information display terminal (12) includes an image acquisition unit. The information display terminal (12) is disposed on the mirror (11) in such a manner that the information display terminal (12) can display information on a surface of the mirror (11) and that the image acquisition unit can acquire an image of a user of the mirror (11). The information display terminal (12) and the attribute estimation device (3) can be connected to each other via a communication line network (2). The attribute estimation (Continued)

device (3) generates attribute information estimated from the acquired image of the user of the mirror (11). The information display terminal (12) displays the generated attribute information on the surface of the mirror (11).

4 Claims, 6 Drawing Sheets

(51) Int. Cl.
  *G06N 20/00* (2019.01)
  *G06F 16/583* (2019.01)

(56) References Cited

U.S. PATENT DOCUMENTS

| | | | |
|---|---|---|---|
| 6,888,955 B2* | 5/2005 | Masumoto | G06K 9/00281 |
| | | | 382/118 |
| 7,593,551 B2* | 9/2009 | Kamei | G06K 9/00268 |
| | | | 382/118 |
| 9,278,108 B2* | 3/2016 | Takenaka | A61K 31/7088 |
| 9,382,544 B2* | 7/2016 | Tsuji | C12N 15/113 |
| 9,454,642 B2* | 9/2016 | Akitomi | C12N 15/115 |
| 9,557,339 B2* | 1/2017 | Takenaka | C12N 15/115 |
| 9,637,737 B2* | 5/2017 | Kaneko | C12Q 1/26 |
| 9,689,025 B2* | 6/2017 | Waga | C12Q 1/6825 |
| 9,783,807 B2* | 10/2017 | Minagawa | C12Q 1/689 |
| 9,790,508 B2* | 10/2017 | Murata | C12N 15/115 |
| 9,880,161 B2* | 1/2018 | Horii | G01N 33/542 |
| 9,880,174 B2* | 1/2018 | Horii | C12Q 1/008 |
| 10,012,631 B2* | 7/2018 | Kaneko | C12Q 1/6825 |
| 10,138,480 B2* | 11/2018 | Kaneko | C12Q 1/26 |
| 10,160,966 B2* | 12/2018 | O'Farrell | C12Q 1/6806 |
| 2005/0086108 A1* | 4/2005 | Sakamoto | G06Q 30/02 |
| | | | 705/14.39 |
| 2012/0076418 A1 | 3/2012 | Sasao et al. | |
| 2014/0334718 A1 | 11/2014 | Yamada et al. | |
| 2015/0086110 A1* | 3/2015 | Nishimura | G06K 9/00275 |
| | | | 382/155 |

FOREIGN PATENT DOCUMENTS

| | | |
|---|---|---|
| JP | 2006-330011 A | 12/2006 |
| JP | 2010-218060 A | 9/2010 |
| JP | 2012-068948 A | 4/2012 |
| JP | 2012-208710 A | 10/2012 |
| JP | 2012-252507 A | 12/2012 |
| WO | 2012/132418 A1 | 10/2012 |

OTHER PUBLICATIONS

Japanese Office Action for JP Application No. 2015-525087 dated Sep. 20, 2017 with English Translation.
Chinese Office Action for CN Application No. 201480037735.X dated Apr. 1, 2017 with English Translation.
International Search Report for PCT Application No. PCT/JP2014/063203, dated Jul. 29, 2014.

* cited by examiner

ATTRIBUTE ESTIMATION SYSTEM

This application is a National Stage Entry of PCT/JP2014/063203 filed on May 19, 2014, which claims priority from Japanese Patent Application 2013-137854 filed on Jul. 1, 2013, the contents of all of which are incorporated herein by reference, in their entirety.

TECHNICAL FIELD

The present invention relates to an attribute estimation system.

BACKGROUND ART

In the field to which apparatuses that need to perform identity verification, such as cigarette vending machines and bank automatic teller machines, pertain, there has been proposed an apparatus configured to acquire a face image by capturing an image of a face of a person with a camera and estimates the attributes of the person such as age and sex from the face image (for example, Patent Document 1). Estimation of the attributes such as age can be achieved by, for example, a model learning procedure, which includes preparing a model with a machine that has learned a large number of pieces of sample image information and comparing an image of a subject whose attributes are to be estimated (referred to as "attribute estimation subject" hereinafter) with the model.

CITATION LIST

Patent Document(s)

Patent Document 1: JP 2010-218060 A

SUMMARY OF THE INVENTION

Problem to be Solved by the Invention

In attribute estimation, acquisition of an image of an attribute estimation subject is important. However, image acquisition may not be achieved properly when the subject is walking or the subject does not face the front, for example. On the other hand, there is a case where it would be desirable to inform the attribute estimation subject of an attribute estimation result immediately.

With the foregoing in mind, it is an object of the present invention to provide an attribute estimation system capable of acquiring an image of an attribute estimation subject accurately and informing the subject of an attribute estimation result.

Means for Solving Problem

In order to achieve the above object, the present invention provides an attribute estimation system including: a mirror equipped with an information display terminal; and an attribute estimation device, wherein the information display terminal comprises an image acquisition unit, the information display terminal is disposed on the mirror in such a manner that the information display terminal can display information on a surface of the mirror and that the image acquisition unit can acquire an image of a user of the mirror, the information display terminal and the attribute estimation device can be connected to each other via a communication line network, the attribute estimation device generates attribute information estimated from the acquired image of the user of the mirror, and the information display terminal displays the generated attribute information on the surface of the mirror.

Effects of the Invention

The attribute estimation system of the present invention is configured so that the information display terminal including the image acquisition unit is attached to the mirror. With this configuration, when an attribute estimation subject is in front of the mirror, an image of the subject can be acquired more accurately by the image acquisition unit. Also, by displaying estimated attribute information on the surface of the mirror by the information display terminal, it is possible to inform the subject of the estimated attribute information immediately.

MODE FOR CARRYING OUT THE INVENTION

In the attribute estimation system of the present invention, it is preferable that the attribute to be generated is impression.

The attribute estimation system of the present invention may be configured so that: the attribute estimation device includes a learning image information database, an attribute information database, an estimation image information database, a model learning unit, and an attribute estimation unit; the model learning unit extracts a feature of an image obtained from the learning image information database, and prepares an evaluation reference model from the feature with reference to the attribute information database; and the attribute estimation unit extracts a feature from the image of the user with reference to the estimation image information database, and generates attribute information estimated from the feature with reference to the evaluation reference model.

In the attribute estimation system of the present invention, it is preferable that the attribute estimation device further includes an ancillary information database and an ancillary information generation unit, and the ancillary information generation unit generates ancillary information relevant to the generated attribute information with reference to the ancillary information database.

The present invention also provides a mirror equipped with an information display terminal, for use in the attribute estimation system according to the present invention, wherein the information display terminal includes an image acquisition unit.

Next, the attribute estimation system of the present invention will be described with reference to illustrative examples.

Figure 1:
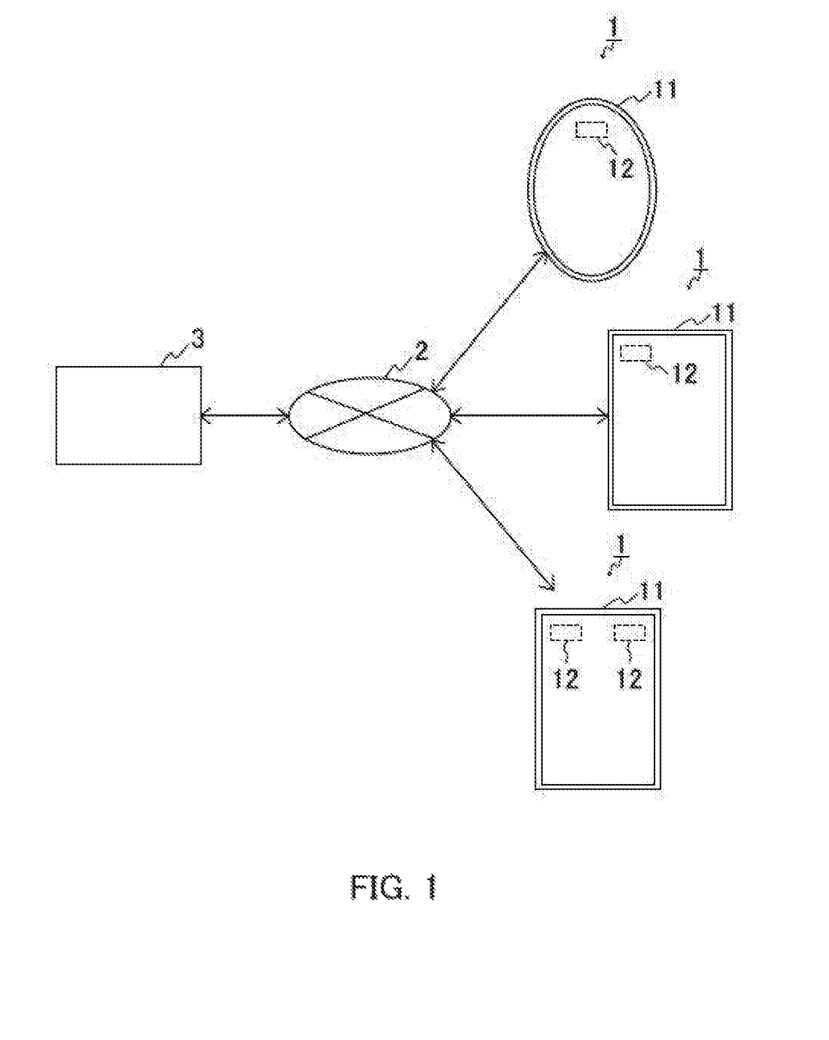
FIG. 1 shows an example of the configuration of the attribute estimation system of the present invention.

FIG. 1 is a schematic view showing an example of the attribute estimation system of the present invention. An attribute estimation system 1 of the present example includes a mirror 11 to which an information display terminal 12 is attached and an attribute estimation device 3, and they are connected to each other via a communication line network 2. The attribute estimation device 3 may be placed in a server.

In the mirror 11 equipped with the information display terminal 12, the mirror 11 is not particularly limited, and a commonly used mirror can be used. The mirror may have a small size sufficient for reflecting a face image, or may be large enough to reflect the whole body, for example. The shape of the mirror may be circular, oval, square, or rectangular, for example. The number of the information display terminals 12 attached to the mirror 11 may be one or may be two or more. The attachment position of the information display terminal 12 is not particularly limited, and may be in any of an upper part, a middle part, and a lower part of the mirror, and also may be at the center or an end of the mirror. The information display terminal 12 is not particularly limited, and may be a camera-equipped smartphone or a camera-equipped tablet, for example. The information display terminal 12 is attached to the mirror 11 in a state where information can be displayed on a surface of the mirror 11 and the image acquisition unit (a camera or the like) can acquire an image of an attribute estimation subject. Such attachment can be achieved by, for example, bonding the display screen of a tablet or the like to the rear surface of a glass sheet as a component of the mirror 11.

Figure 2:
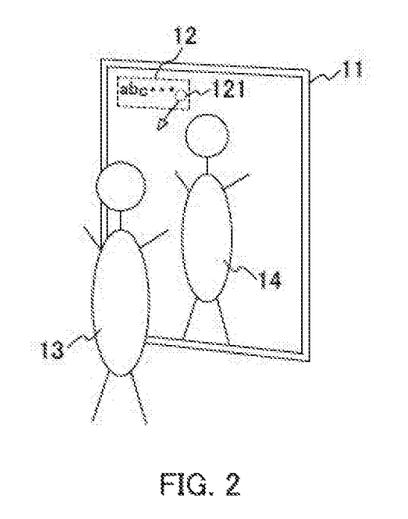
FIG. 2 is an explanatory view showing an example of the use of the attribute estimation system of the present invention.

FIG. 2 shows an example of the use of the mirror 11 equipped with the information display terminal 12 in the attribute estimation system of the present invention. As shown in FIG. 2, in the present example, the mirror 11 is rectangular, and the mirror 11 can reflect almost the whole body of an attribute estimation subject 13 on its surface. In FIG. 2, reference numeral 14 denotes an image of the attribute estimation subject reflected on the mirror. The information display terminal 12 is disposed at the upper left end on the mirror 11. As indicated with the arrow, an image acquisition unit 121 captures an image of the attribute estimation subject 13 who is using the mirror 11, whereby the image is acquired.

In the present invention, the image is not particularly limited, and may be an image of a part of the body, such as a face image, or may be an image of the whole body. In the present invention, examples of the attribute to be estimated include age, sex, personal belongings, and impression. Examples of the impression include impressions of facial expressions, make-up, faces, and outfits.

The communication line network 2 may be either wired or wireless. Examples of the communication line network 2 include the Internet and LAN.

Figure 3:
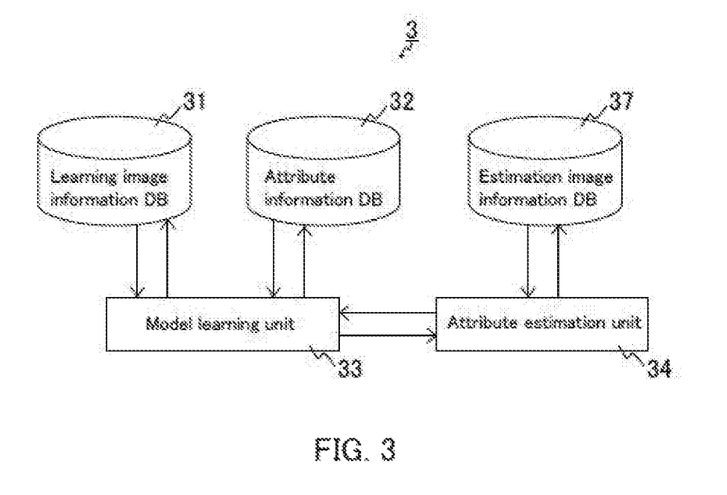
FIG. 3 is a schematic view showing the configuration of an example of the attribute estimation device of the present invention.
Figure 5:
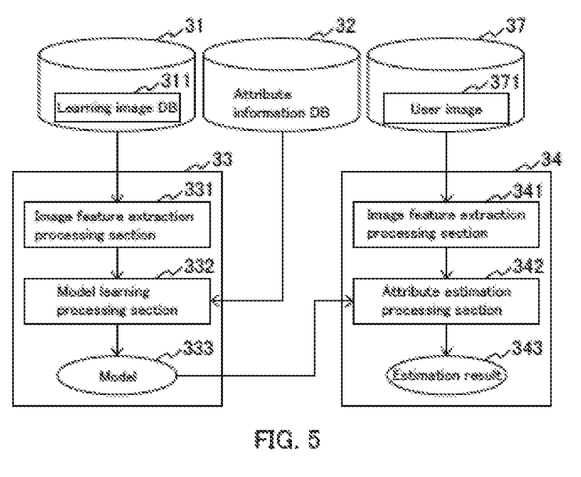
FIG. 5 shows the configuration of the example of the attribute estimation device of the present invention.

FIG. 3 shows an example of the configuration of the attribute estimation device in the attribute estimation system of the present invention. As shown in FIG. 3, an attribute estimation device 3 in the present example includes a learning image information database (DB) 31, an attribute information database (DB) 32, an estimation image information database (DB) 37, a model learning unit 33, and an attribute estimation unit 34. FIG. 5 specifically shows the configuration of the attribute estimation device of the present example. As shown in FIG. 5, the attribute estimation device of the present example is configured so that: the learning image information database 31 includes a learning image database (DB) 311; the model learning unit 33 includes an image feature extraction processing section 331 and a model learning processing section 332; and the attribute estimation unit 34 includes an image feature extraction processing section 341 and an attribute estimation processing section 342. The acquired attribute estimation subject image (user image) 371 is stored in the estimation image information database 37. In the model learning unit 33, the image feature extraction processing section 331 extracts a feature on an image obtained from the learning image database 311, and the model learning processing section 332 prepares an evaluation reference model 333 from the feature with reference to the attribute information database 32. On the other hand, in the attribute estimation unit 34, the image feature extraction processing section 341 extracts a feature from the user image 371 with reference to the estimation image information database 37, and the attribute estimation processing section 342 generates attribute information (estimation result) 343 estimated from the feature with reference to the evaluation reference model 333.

Figure 4:
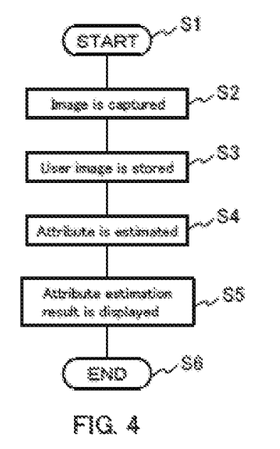
FIG. 4 is a flowchart showing an example of attribute estimation in the attribute estimation system of the present invention.

FIG. 4 is a flowchart showing attribute estimation in the attribute estimation system of the present invention. As shown in FIG. 4, when attribute estimation is started (S1), first, the image acquisition unit captures an image of an attribute estimation subject using a mirror (user image) (S2). Next, the user image is stored in the estimation image information database in the attribute estimation device (S3). Then, the attribute estimation is carried out in the above-described manner (S4). The estimated attribute is displayed as the attribute estimation result (S5). Thus, a series of processes are completed (S6).

Figure 6:
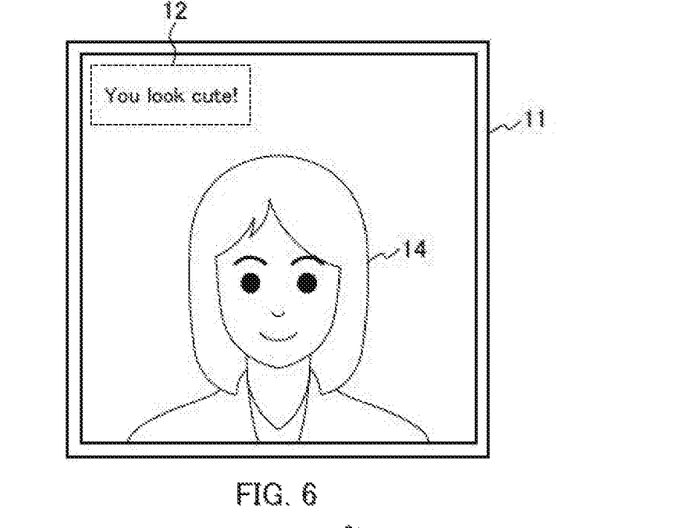
FIG. 6 shows an example of a display state on the surface of the mirror in the attribute estimation system of the present invention.

FIG. 6 shows an example of the display of the estimated attribute. As shown in FIG. 6, an image 14 of an attribute estimation subject is reflected on the surface of the mirror 11, and at the same time, the information display terminal 12 disposed at the upper left end of the mirror 11 displays the attribute estimation result "You look cute!". The attribute estimation result to be displayed may be a calculated attribute value such as "Cute level: 87 points", for example.

Figure 7:
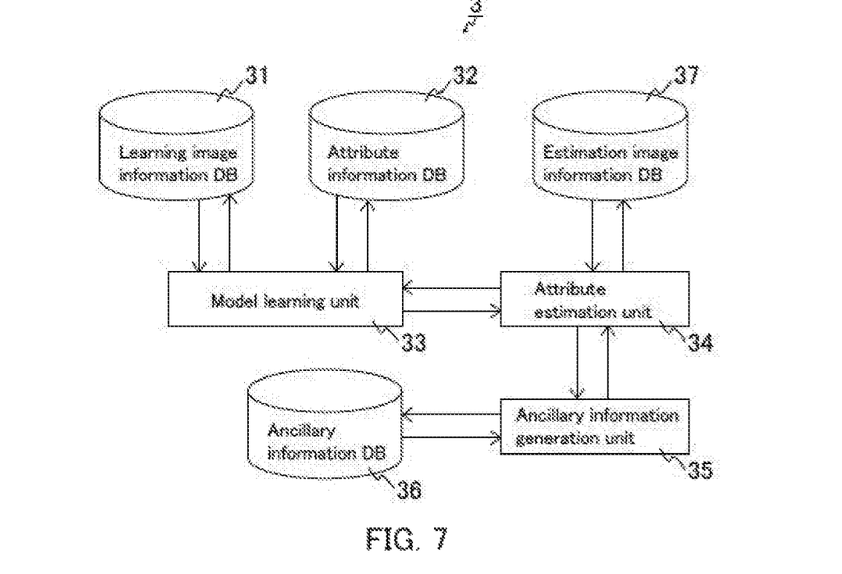
FIG. 7 shows the configuration of another example of the attribute estimation device of the present invention.

Next, FIG. 7 shows an example of the configuration of the attribute estimation device adapted to generate ancillary information. As shown in FIG. 7, the attribute estimation device of the present example has the same configuration as the attribute estimation device shown in FIG. 3, except that it further includes an ancillary information database (DB) 36 and an ancillary information generation unit 35. The ancillary information generation unit 35 generates ancillary information relevant to the generated attribute information with reference to the ancillary information database 36. The ancillary information to be generated is not particularly limited, and examples thereof include: health-related information such as information on supplements, meals, pharmaceuticals, and hospitals; fashion-related information such as information on cosmetics and clothes; entertainment-related information such as information on sports stadia, movie theaters, and art museums; information related to an attribute estimation subject, such as information on the schedule of the subject and information on weather; and information in consideration of the preference of the attribute estimation subject.

Figure 8:
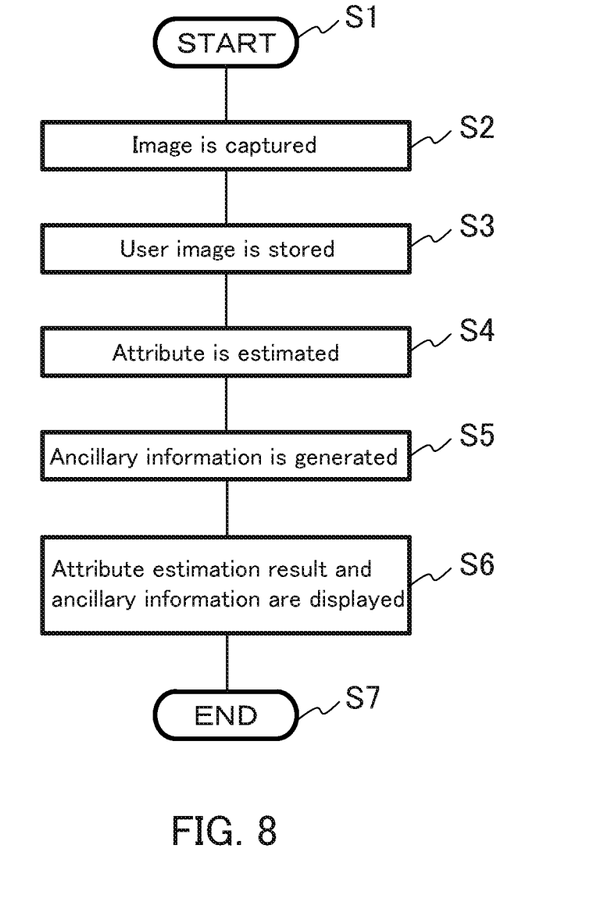
FIG. 8 is a flowchart showing another example of attribute estimation in the attribute estimation system of the present invention.

FIG. 8 is a flowchart showing the processes in the case where ancillary information is generated. As shown in FIG. 8, the flowchart of FIG. 8 is the same as the flowchart of FIG. 4, except that, after the attribute estimation (S4), ancillary information is generated (S5) and the ancillary information is displayed together with the attribute estimation result (S6).

Figure 9:
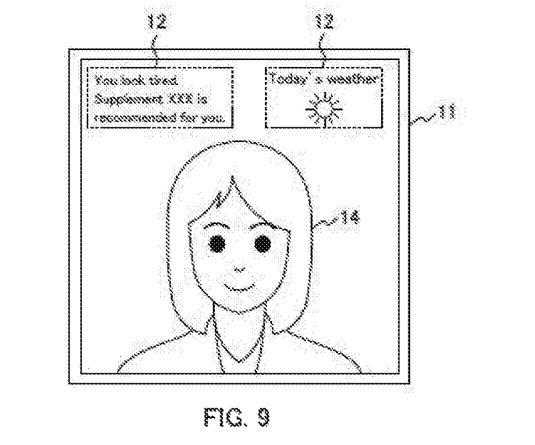
FIG. 9 shows another example of a display state on the surface of the mirror in the attribute estimation system of the present invention.

FIG. 9 shows an example of the display of ancillary information. As shown in FIG. 9, information display terminals 12 are attached to upper right and left ends of the mirror 11. The information display terminal 12 at the left end displays attribute information that "You look tired" as the attribute estimation result, and also displays, as information relevant to the attribute information, ancillary information that "Supplement XXX is recommended for you." The ancillary information to be displayed may be generated on the basis of the mean value of the calculated attribute values obtained in the last one month. For example, when the obtained attribute value is lower than the mean value, the ancillary information such as "Are you little more tired than usual?" may be displayed, or when the obtained attribute value is higher than the mean value, the ancillary information such as "Did something good happen to you?" may be displayed. The information display terminal 12 at the right end displays, as ancillary information, "Today's weather" and a sunny mark. The display shown in FIG. 9 is the same as the display shown in FIG. 6, except for the above.

Figure 10:
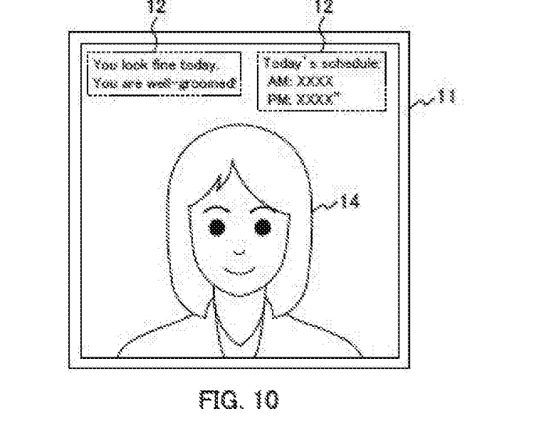
FIG. 10 shows still another example of a display state on the surface of the mirror in the attribute estimation system of the present invention.

FIG. 10 shows another example of the display of ancillary information. As shown in FIG. 10, information display terminals 12 are attached to upper right and left ends of the mirror 11. The information display terminal 12 at the left end displays attribute information that "You look fine today." and "You are well-groomed!" as the attribute estimation results. The information display terminal 12 at the right end displays "Today's schedule AM: XXXX, PM: XXXX" as ancillary information. The ancillary information to be displayed may be linked with the schedule of the attribute estimation subject, weather information, and the like. For example, when the weather forecast predicts it would rain, personal belongings of the attribute estimation subject may be estimated as the attribute, and "You should take an umbrella." may be displayed as ancillary information; the impression of the outfit of the subject in the morning of the day when a meeting had been scheduled may be estimated, and "Don't you need a jacket?" may be displayed as ancillary information; or the impression of the outfit of the subject in the morning of the day when a barbecue had been scheduled may be estimated, and "Your white skirt may get dirty." may be displayed as ancillary information. The display shown in FIG. 10 is the same as the display shown in FIG. 6, except for the above.

In the present invention, information irrelevant to attribute information also may be displayed. Examples of such information include emergency information such as information on fires and earthquakes.

While the present invention has been described above with reference to illustrative embodiments, the present invention is by no means limited thereto. Various changes and modifications that may become apparent to those skilled in the art may be made in the configuration and specifics of the present invention without departing from the scope of the present invention.

This application claims priority from Japanese Patent Application No. 2013-137854 filed on Jul. 1, 2013. The entire disclosure of this Japanese patent application is incorporated herein by reference.

INDUSTRIAL APPLICABILITY

The present invention can be used widely in the field where attributes such as age, sex, personal belongings, impression of a face, and impression of an outfit are estimated from images, and the use of the present invention is not limited by any means.

EXPLANATION OF REFERENCE NUMERALS

1: attribute estimation system
2: communication line network
3: attribute estimation device
11: mirror
12: information display terminal
13: attribute estimation subject
14: image of attribute estimation subject reflected on mirror
31: learning image information database
32: attribute information database
33: model learning unit
34: attribute estimation unit
35: ancillary information generation unit
36: ancillary information database
37: estimation image database
121: image acquisition unit
311: learning image database
331, 341: image feature extraction processing section
332: model learning processing section
333: evaluation reference model
342: attribute estimation processing section
343: estimation result
371: user image

What is claimed is:
1. An attribute estimation system comprising:
a mirror equipped with an information display terminal; and
an attribute estimation device,
wherein the information display terminal comprises an image acquisition unit,
the information display terminal is disposed on the mirror in such a manner that the information display terminal can display information on a surface of the mirror and that the image acquisition unit can acquire an image of a user of the mirror,
the information display terminal and the attribute estimation device can be connected to each other via a communication line network,
the attribute estimation device generates attribute information estimated from the acquired image of the user of the mirror,
the attribute estimation device further comprises an ancillary information database and an ancillary information generation unit,
the ancillary information generation unit generates ancillary information relevant to the generated attribute information with reference to the ancillary information database,
the ancillary information is at least one piece of information selected from the group consisting of information on supplements, information on pharmaceuticals, information on hospitals, information on cosmetics, information on sports stadia, information on movie theaters, information on art museums, information on schedules, and information on weather, the information display terminal displays the generated attribute information and the ancillary information on the surface of the mirror, the attribute estimation device is placed in a server, and the information display terminal is at least one of a camera-equipped smartphone and a camera-equipped tablet.

2. The attribute estimation system according to claim 1, wherein the attribute to be generated is impression.

3. The attribute estimation system according to claim 1, wherein the attribute estimation device comprises a learning image information database, an attribute information database, an estimation image information database, a model learning unit, and an attribute estimation unit, the model learning unit extracts a feature of an image obtained from the learning image information database, and prepares an evaluation reference model from the feature with reference to the attribute information database, and the attribute estimation unit extracts a feature from the image of the user with reference to the estimation image information database, and generates attribute information estimated from the feature with reference to the evaluation reference model.

4. A mirror equipped with an information display terminal, for use in the attribute estimation system according to claim 1, wherein the information display terminal comprises an image acquisition unit.

* * * * *